US012689561B2

(12) United States Patent
Maslak

(10) Patent No.: US 12,689,561 B2
(45) Date of Patent: Jul. 21, 2026

(54) SYSTEM AND METHOD FOR DETERMINING CAPACITY OF A TELECOMMUNICATIONS NETWORK

(71) Applicant: Sandpiper CDN, LLC, Wilmington, DE (US)

(72) Inventor: Joelle T. Maslak, Golden, CO (US)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

(21) Appl. No.: 18/900,388

(22) Filed: Sep. 27, 2024

(65) Prior Publication Data

US 2025/0097154 A1      Mar. 20, 2025

Related U.S. Application Data

(63) Continuation of application No. 18/240,028, filed on Aug. 30, 2023, now Pat. No. 12,132,659, which is a continuation of application No. 17/104,039, filed on Nov. 25, 2020, now Pat. No. 11,750,521, which is a continuation of application No. 15/299,224, filed on Oct. 20, 2016, now Pat. No. 10,855,591.

(Continued)

(51) Int. Cl.
H04L 41/147      (2022.01)
H04L 43/0882      (2022.01)
H04L 47/125      (2022.01)

(52) U.S. Cl.
CPC ........ *H04L 41/147* (2013.01); *H04L 43/0882* (2013.01); *H04L 47/125* (2013.01)

(58) Field of Classification Search
CPC .. H04L 47/125; H04L 41/147; H04L 43/0882
See application file for complete search history.

(56) References Cited

U.S. PATENT DOCUMENTS 6,404,880 B1      6/2002   Stevens
6,888,797 B1      5/2005   Cao et al.
(Continued)

OTHER PUBLICATIONS

International Search Report dated Dec. 30, 2016, Int'l Patent Application No. PCT/US2016/057965, Int'l Filing Date Oct. 20, 2016. 3 pages.

(Continued)

*Primary Examiner* — Jackie Zuniga Abad
(74) *Attorney, Agent, or Firm* — C. Tumey Law Group PLLC

(57) ABSTRACT

Aspects of the present disclosure involve systems, methods, computer program products, and the like, for determining an estimated capacity for providing data from a telecommunications network to a plurality of end users. In one implementation, the estimated capacity for delivering the data to the end users is per transmission path or per access network connected to the telecommunications network. This information may be aggregated into a traffic flow table that illustrates the traffic flow and available capacity to one or more end user networks. Through analysis of the traffic flow table, the system determines an estimated available capacity to provide the data to the end users. The traffic flow table thus provides a more accurate estimate of the capacity of the telecommunications network to provide the data to the end users over previous capacity estimates.

17 Claims, 5 Drawing Sheets

Related U.S. Application Data

(60) Provisional application No. 62/244,319, filed on Oct. 21, 2015.

(56) References Cited

U.S. PATENT DOCUMENTS

| | | | |
|---|---|---|---|
| 7,359,329 | B2 | 4/2008 | Kikuchi et al. |
| 9,258,253 | B2 * | 2/2016 | Subramanian ........ H04L 49/356 |
| 10,855,591 | B2 | 12/2020 | Maslak |
| 11,750,521 | B2 | 9/2023 | Maslak |
| 12,132,659 | B2 | 10/2024 | Maslak |
| 2008/0239950 | A1 | 10/2008 | Hlibiciuc et al. |
| 2009/0116404 | A1 | 5/2009 | Mahop et al. |
| 2010/0306408 | A1 | 12/2010 | Greenberg et al. |
| 2013/0070592 | A1 | 3/2013 | Chen et al. |
| 2014/0022901 | A1 | 1/2014 | Suzuki et al. |
| 2014/0344331 | A1 | 11/2014 | Johns et al. |
| 2015/0381496 | A1 | 12/2015 | Minato |
| 2017/0118122 | A1 | 4/2017 | Maslak |
| 2021/0083979 | A1 | 3/2021 | Maslak |
| 2023/0412509 | A1 | 12/2023 | Maslak |

OTHER PUBLICATIONS

Written Opinion of the International Searching Authority dated Dec. 30, 2016, Int'l Patent Application No. PCT/US2016/057965, Int'l Filing Date Oct. 20, 2016. 7 pages.

International Preliminary Report on Patentability dated Apr. 24, 2018, Int'l Patent Application No. PCT/US2016/057965, Int'l Filing Date Oct. 20, 2016. 9 pages.

Non-Final Office Action Summary for U.S. Appl. No. 15/299,224 dated Mar. 29, 2018. 25 pages.

Final Office Action Summary for U.S. Appl. No. 15/299,224 dated Oct. 5, 2018. 31 pages.

Appeal Brief for U.S. Appl. No. 15/299,224 dated Jan. 28, 2019. 22 pages.

Examiner's Answer to Appeal Brief for U.S. Appl. No. 15/299,224 dated May 24, 2019. 35 pages.

Reply Brief or U.S. Appl. No. 15/299,224 dated Jul. 11, 2019. 6 pages.

Patent Trial and Appeal Board Decision On Appeal—Examiner Reversed for U.S. Appl. No. 15/299,224 dated Aug. 7, 2020. 8 pages.

Patent Trial and Appeal Board Oral Hearing Transcript for U.S. Appl. No. 15/299,224 dated Aug. 12, 2020. 17 pages.

Non-Final Office Action Summary for U.S. Appl. No. 17/104,039 dated Jan. 19, 2022. 26 pages.

Final Office Action Summary for U.S. Appl. No. 17/104,039 dated Jul. 15, 2022. 30 pages.

Non-Final Office Action Summary for U.S. Appl. No. 17/104,039 dated Apr. 10, 2022. 11 pages.

Non-Final Office Action Summary for U.S. Appl. No. 18/240,028 dated Apr. 1, 2024. 10 pages.

Comcast Ethernet Network Service Technical Description Document. Comcast Business, SLS56950_5.17. 2 pages.

* cited by examiner

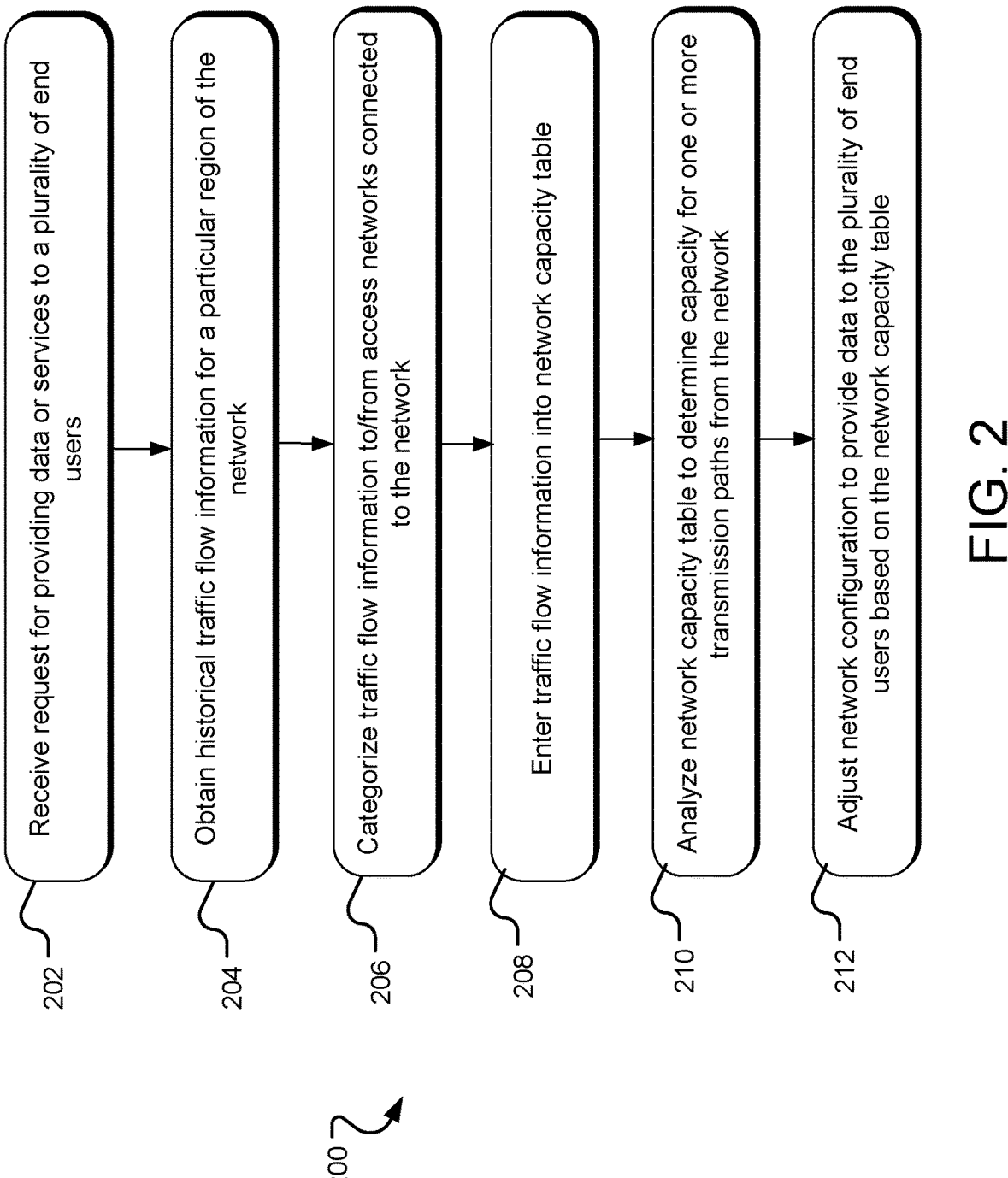

202 — Receive request for providing data or services to a plurality of end users 204 — Obtain historical traffic flow information for a particular region of the network 206 — Categorize traffic flow information to/from access networks connected to the network 208 — Enter traffic flow information into network capacity table 210 — Analyze network capacity table to determine capacity for one or more transmission paths from the network 212 — Adjust network configuration to provide data to the plurality of end users based on the network capacity table

SYSTEM AND METHOD FOR DETERMINING CAPACITY OF A TELECOMMUNICATIONS NETWORK

CROSS-REFERENCE TO RELATED APPLICATIONS

The present application is a continuation of U.S. application Ser. No. 18/240,028, filed Aug. 30, 2023, which is a continuation of U.S. application Ser. No. 17/104,039, filed Nov. 25, 2020, issued as U.S. Pat. No. 11,750,521, which is a continuation of U.S. application Ser. No. 15/299,224, filed Oct. 20, 2016, issued as U.S. Pat. No. 10,855,591, which claims priority to U.S. Provisional Application No. 62/244,319, filed Oct. 21, 2015, the disclosures of which are incorporated herein by reference.

TECHNICAL FIELD

Aspects of the present disclosure generally relate to systems and methods for implementing a telecommunications network, and more specifically for determining available capacity of one or more ports of the telecommunications network for providing data to customers of the network.

BACKGROUND

Telecommunication or other types of computer networks provide for the transmission of information across some distance through terrestrial, wireless or satellite communication networks. Such communications may involve voice, data or multimedia information, among others. Typically, such networks include several servers or other resources from which the content or network services can be supplied to a requesting end user. Thus, most end users can access the network through one or more access networks or ports into the network such that there may be present several transmission paths between the network server and the end user. Determining which path content or data takes through the network to a requesting end user is often difficult for network administrators.

In addition, it is often the case that customers or clients utilize a telecommunications network to provide vast amounts of data to many end users of the network. In these circumstances, the customers will request capacity information for providing the data to the end users. The network or network administrators estimate the available capacity for the customer on the telecommunications network in a general manner that does not take into account the various transmission paths through the network to the end users of the network. As such, the capacity estimates provided by the telecommunications network may overestimate the available capacity for one or more transmission paths when providing such estimates to the network customer. In this manner, the network may not be able to provide some services to a customer after the estimated available capacity is provided.

It is with these and other issues in mind that various aspects of the present disclosure were developed.

SUMMARY

One implementation of the present disclosure may take the form of a method for providing data from a telecommunications network. The method includes the operations of obtaining traffic flow information for the telecommunications network, the traffic flow information comprising an estimated bytes of data transmitted from the telecommunications network through a plurality of egress ports to a plurality of end user networks in communication with the telecommunications network, wherein each egress port of the plurality of egress ports is associated with at least one of the plurality of end user networks and receiving an indication of available capacity for each of the plurality of egress ports. Further, the method includes the operations of storing the traffic flow information and indication of available capacity for each of the plurality of egress ports in a database, calculating an estimated capacity for each of a set of the plurality of egress ports, and adjusting a network configuration based at least on the calculated estimated capacity for each of a set of the plurality of egress ports to provide a requested network service to a plurality of end users of the telecommunications network.

Yet another implementation of the present disclosure may take the form of a system for operating a telecommunications network. The system includes a server with a processor and a computer-readable medium associated with the processor and including instructions stored thereon and executable by the processor. When executed, the processor performs the operations of obtaining traffic flow information for the telecommunications network, the traffic flow information comprising an estimated bytes of data transmitted from the telecommunications network through a plurality of egress ports to a plurality of end user networks in communication with the telecommunications network, wherein each egress port of the plurality of egress ports is associated with at least one of the plurality of end user networks and receiving an indication of available capacity for each of the plurality of egress ports. Further, the instructions cause the processor to store the traffic flow information and indication of available capacity for each of the plurality of egress ports in a database, calculate an estimated capacity for each of a set of the plurality of egress ports, and adjust a network configuration based at least on the calculated estimated capacity for each of a set of the plurality of egress ports to provide a requested network service to a plurality of end users of the telecommunications network.

BRIEF DESCRIPTION OF THE DRAWINGS

FIG. 2 is a flowchart illustrating a method for adjusting a telecommunications network configuration in response to transmission path specific capacity information.

FIG. 3 is a network capacity table to a plurality of end user networks of a telecommunications network.

FIG. 4 is a network capacity table to a plurality of end user networks of a telecommunications network utilized to configure a network in response to a customer request.

DETAILED DESCRIPTION

Figure 1:
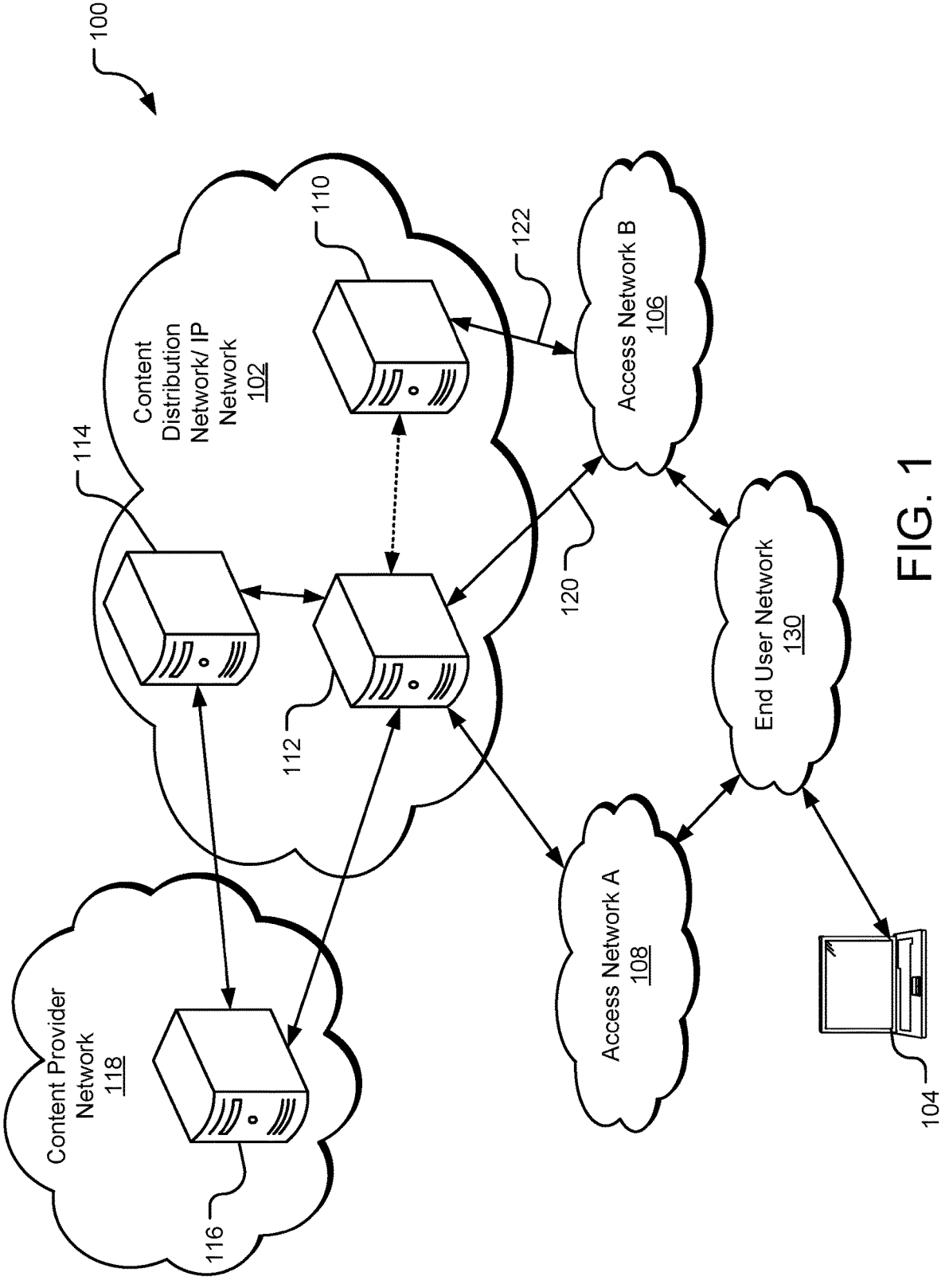
FIG. 1 is an example network environment for distributing content to an end user from a network, such as a content delivery network.

Aspects of the present disclosure involve systems, methods, computer program products, and the like, for determining an estimated capacity for providing data from a telecommunications network to a plurality of end users. In one implementation, the estimated capacity for delivering the data to the end users is per transmission path or per access network connected to the telecommunications network.

Thus, the system may obtain network traffic flow information to and from one or more access networks connected to the telecommunications network. This information may be aggregated into a traffic flow table that illustrates the traffic flow and available capacity to the one or more access networks. In one instance, the one or more access networks may be the available access networks for a particular geographic area or region, such as North America. Through analysis of the traffic flow table, the system determines an estimated available capacity to provide the data to the end users. The traffic flow table thus provides a more accurate estimate of the capacity of the telecommunications network to provide the data to the end users over previous capacity estimates.

Further, the traffic flow table information may be utilized by the telecommunications network or a network administrator to configure the network to provide the data to the end users. For example, particular transmission paths may have capacity to carry the data while other transmission paths may have little to no available capacity. A network administrator may then decide which access networks or transmission paths are available to provide the data and configure the network to provide the data to the end users through the available access networks. This provides a more efficient telecommunications network that lessens congestion at access networks or transmission paths that already transmit large amounts of data. The traffic flow table information may also be utilized by sales people associated with the telecommunications network in selling telecommunication services to existing and potential customers. In general, determining the available capacity of transmission paths through one or more access networks in a region provides a clearer understanding of the capabilities of the network when providing services to customers and end users of the network.

In other embodiments, the telecommunications network may utilize the capacity information to provide versatility in providing and billing for provided content. For example, the information may be used in an auction-type of system to price bandwidth which would then result in the highest bidder being allowed to utilize certain paths, while selling remaining bandwidth paths to the next bidder, and/or providing the next bidder with an indication of how much traffic the network can accept in a region. Also, if demand cannot be met, the network may tell the requesting customer how much traffic can be served, without disclosing at which point the network would become congested.

FIG. 1 is an example network environment 100 for distributing content to one or more users. In one implementation, a CDN 102 is communicably coupled to one or more access networks 106,108. Although a CDN 102 is illustrated in FIG. 1, it should be appreciated that the embodiments of the present disclosure may be utilized in any type of computer network, including but not limited to, a Voice over Internet Protocol (VoIP) network, a Domain Name System (DNS) network, enterprise network and the like. Regardless of the type of network used, the one or more access networks 106,108 may be under the control of or operated/maintained by one or more entities that provide access to the CDN 102. For example, the network environment 100 of FIG. 1 illustrates two access networks, namely access network A 108 and access network B 106, through which content may be retrieved from the CDN 102. To access the CDN 102, a user may utilize an end user device 104 (discussed in more detail below) to access an end user network 130. The end user network 130 may provide Internet access to a user device 104 associated with an end user network, such as, for example, one or more Internet Service Providers (ISPs). In turn, the end user network 104 utilizes one or more access networks 106, 108 to obtain content from the CDN 102. The process through which the end user network 130 selects an access network 106, 108 to access the CDN 102 is discussed in greater detail below.

As mentioned, the CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent through the end user network 130 and one or more access network 106, 108 to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 possibly via an intermediate device, for example, in the access network 106,108. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

Although the edge server 112, the content distribution server 114, and the content origin server 116 are shown as part of the CDN 102, it should be appreciated that the access networks 106, 108 may also include similar components. Thus, the content requested by the user device 104 may be provided from access network A 108, access network B 106, and/or the end user network 130 in a similar manner as described above. In other words, the content requested and provided to the end user 104 may take many routes through the CDN 102, access networks 106, 108, and the end user network 130 depending on which content server is tasked with providing the content. Thus, although this particular disclosure utilizes the example of providing the content to the requesting device 104 through access network A 108 or access network B 106, any number of access networks and connections to the CDN 102 may be utilized by the end user network 130 to receive the requested content. Further, although discussed in relation to a CDN 102, similar methods and techniques discussed herein apply to other telecommunications networks, such as a network providing IP-related services to the end user 104.

In one embodiment of the network 100, many end user devices 104 may request the same or similar content from the CDN 102. For example, the CDN 102 may store and provide a software update to any number of end user devices 104 in communication with the CDN 102. Thus, the content provided by the CDN 102 may be transmitted to hundreds or thousands of end user devices 104, potentially at the same time, resulting in the transmission of large amounts of data from the CDN to the various user devices. As such, the network 102 or administrator of the network may determine the capacity available from the network to provide to the large amounts of data before transmitting the data to the end users 104. In this manner, the impact of the transmission of the data to the end users 104 may be estimated so that network performance may be maintained.

Traditionally, the network 102 or network administrator would determine the capacity for providing content to end users 104 may simply adding up the available capacity through all transmission paths to the end user. Utilizing the configuration 100 of FIG. 1, the CDN 102 may determine the available capacity to the end user 104 through access network A 108 and through access network B 106 and determine the overall available capacity by adding the capacities of each access network together. However, the CDN 102 may not generally provide content to the end user 104 equally through the various access networks 106, 108 available to the end user. Rather, the CDN 102 typically attempts to provide the content to the end user 104 along the shortest geographical path to reduce transmission impact on the network. In other words, if access network A 108 is geographically (or in some instances, logically) closer to the server providing the content to the end user device 104, the CDN 102 may be biased to provide the content to the end user device through access network A. In such a case, although access network B 106 may have more capacity to provide the content to the end user 104, the content may instead be provided to the end user through access network A 108 due to the location of the server 112 providing the content. This inaccuracy in the determination of the capacity of the CDN 102 to provide the content is increased as more and more end user devices 104 request content from the CDN, especially if a majority of those end user devices receive the content through a particular access network.

In addition, end user network 130 may have a business or other type of relationship with access network A 108 or access network B 106 whereby end user network utilizes some form of traffic engineering to ensure inbound traffic from network 102 is distributed in some manner between both access network A and access network B. For example, end user network 130 may advertise 50% of its network routes via access network A 108 and advertises the other 50% of its network routes via access network B 106. In such a case, 50% of the traffic from network 102 flows through access network A 108 and 50% flows through access network B 106. Determining the point of congestion if incremental traffic is added to network 102 may be complex because end user network 130 may not directly connect to the CDN. In this manner, there exist situations where traffic flows are distributed across multiple access networks, but not all access networks are able to reach all of a given end user network directly.

To address this inaccuracy in determining the capacity of the CDN 102 to provide large amounts of data to one or more end user devices 104, a more accurate method for determining the capacity of the CDN is provided below. In particular, FIG. 2 is a flowchart illustrating a method for adjusting a telecommunications network configuration in response to transmission path specific capacity information. In general, the operations of FIG. 2 are performed by the network (such as the CDN 102 of FIG. 1) or a network administrator. In one particular example, the operations may be a script that is executed by a computing device. The method 200 determines capacity for providing data from the network 102 based on various transmission paths the provided data may travel through one or more access networks connected to the network. Thus, capacity information may be obtained and determined based on multiple transmission paths for provided requested data to an end user to provide a more detailed understanding of the available capacity of the network. This information may then be utilized to adjust the configuration of the network to accommodate the request for providing the data.

In operation 202, the network 102 or network administrator receives a request to provide data or telecommunication services to a plurality of end users 104 connected to the network. In one example, the network 102 may receive a request from a customer to provide a software update to each end user 104 of the network with a particular computing device. In this example, large amounts of data may be provided to many end user devices 104 from the network 102, consuming large amounts of network capacity in the process. In response to this request, the network 102 or administrator may determine if the network has enough capacity to meet the request to provide the data and may adjust the network configuration accordingly once the available network capacity is determined. In other examples, the request may be received via an automated traffic reservation system and may be automatically processed, sent back to a human operator or automated system to adjust the network based on whether or not the demand can be met without any network changes.

To determine the available network capacity, the network 102 may obtain traffic flow information for a particular region of the network in operation 204. For example, the network 102 may obtain traffic flow information for the portion of the network in North America or in Europe. In general, the region of the network 102 from which the traffic flow information is obtained may be any portion of the network related to any region, including the entire network. Further, the type of traffic flow information obtained by the network may be similar in nature to the request received from the customer. More particularly, the network 102 may determine the type of data or services requested to be provided by the network. For example, the customer may request the network provide data from a CDN 102 to one or more end users 104. In such a circumstance, the network 102 may obtain historical CDN-related traffic flow information to aid in determining the capacity for transmission paths from the CDN to the end users. In another example, the customer may request providing data through one or more IP-based services to end users 104 of the network 102. In this circumstance, the network 102 may obtain IP-related traffic flow information from the network to end users 104 to aid in determining the capacity for transmission paths from the network to the end users. In this manner, the network 102 may obtain type-specific traffic flow information for the network based on the type of data or services requested by the customer to be provided by the network.

The traffic flow information obtained by the network may include any information concerning the flow of packets to and from the network. For example and as mentioned above, the traffic flow information may be for a particular region of the network. Further, the traffic flow information may be categorized or parsed based on any characteristic of the packets transmitted by or to the network in operation 206. For example, the traffic flow information may be categorized based on the gateway each packet enters the network (referred to as the "source gateway"), the gateway each packet leaves the network (referred to as the "egress gateway"), the destination access network (referred to as the "destination Autonomous System Number" (ASN)), the access network to which each packet leaves the network (referred to as the "egress ASN"), the particular port through which each packet leaves the network (referred to as the "egress interface"), the particular port through which each packet enters the network (referred to as the "ingress interface"), and the like. In one implementation, the network 102 may use the categorized information to determine the number of bytes or packets that are transmitted to and from the network to various access networks 106, 108 connected to the network. As explained in more detail below, this information may be aggregated into a table to provide the network or administrator of the network an estimated available capacity for transmission paths to/from the network.

In addition, such categorized traffic flow information may aid the network 102 in determining the type of data or services requested by the customer. For example, the customer may request bandwidth from the network 102 for providing data from the customer's network to end users 104. By analyzing the inbound traffic packets from the customer's network, the network 102 may determine the type of data or services being provided and tailor obtaining the traffic flow information accordingly. In particular, if the data provided by the customer's network arrives on an inbound port associated with a CDN or from a particular source gateway associated with the CDN, the network 102 may determine that the data provided is likely to be provided from a CDN-type network. Thus, the network 102 may obtain traffic flow information for a CDN portion of the network to more finely tune the information used to estimate the available capacity of one or more transmission paths for providing the data to the end users 104.

Figure 3:
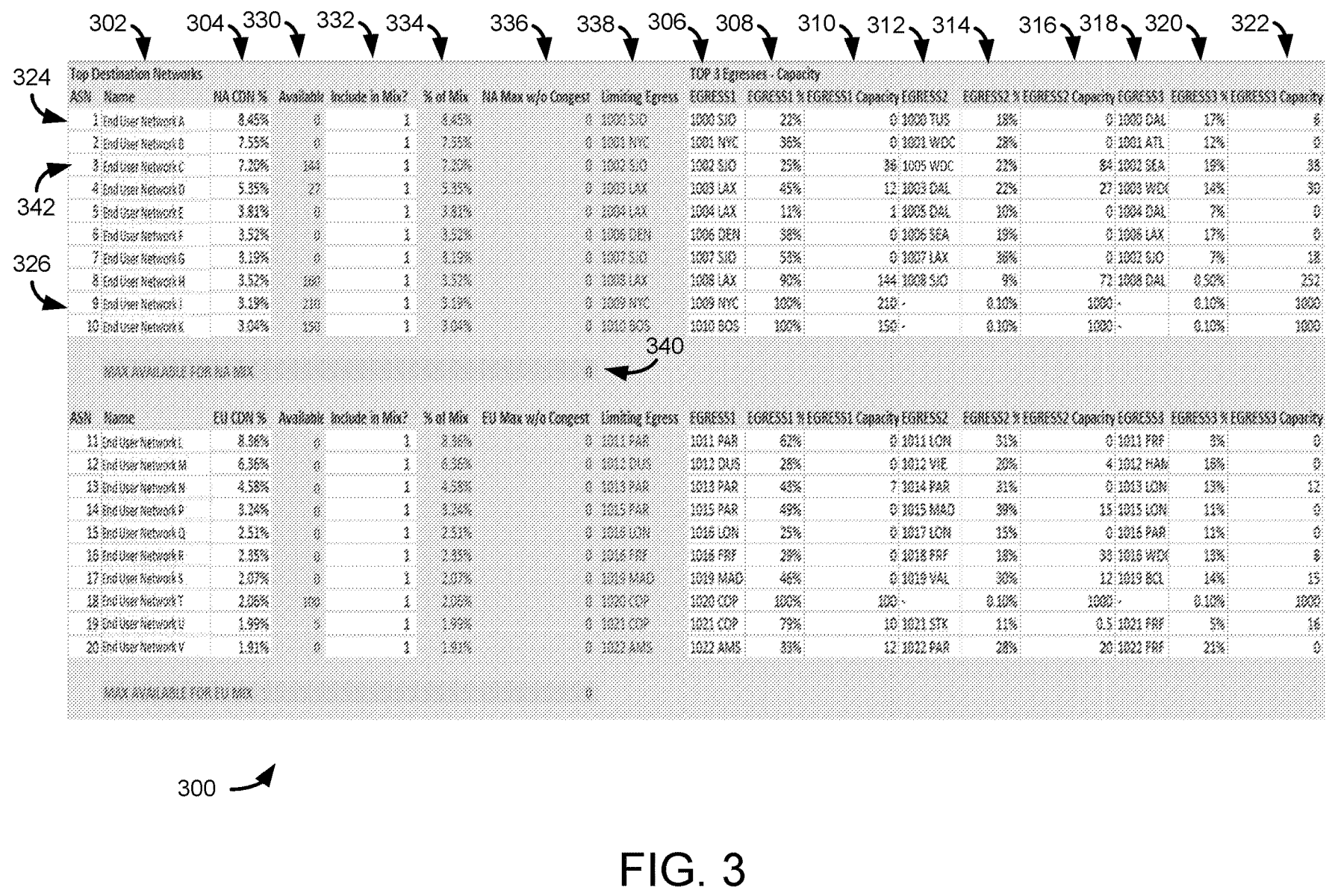

In operation 208, the categorized traffic flow information is aggregated and entered into a network capacity table. For example, FIG. 3 is a network capacity table 300 for a plurality of transmission paths from a network 102 to a plurality of end user networks. In particular, the table 300 shows the top ten destination end user networks for a North America region of the network and the top ten destination end user networks for a European region of the network. The top end user networks are listed in column 302 of the table 300, showing end user networks A-K being North American end user networks and end user networks L-V being European end user networks. Also, each end user network is associated with a corresponding ASN listed in the table for quick reference by a user of the table. Although the table 300 shown in FIG. 3 includes ten end user networks for each region of the network 102, the traffic flow data from any number of such end user networks may be included in the table.

In general, the traffic flow information obtained by the network 102 as discussed above is utilized to populate the columns and rows of the network capacity table 300. For example, because the traffic flow information may be categorized based on inbound, egress, and destination information, the relative transmission path through the network 102 for various packets may be determined and associated with one or more end user networks. As such, the general traffic flow to and from one or more end user networks 130 associated with the network 102 may be determined and the estimated capacity for providing additional packets and/or data along those transmission paths to the end user networks may be determined. This is illustrated in the network capacity table 300 of FIG. 3. For example, the traffic flow information of the network 102 may be utilized to determine the overall percentage of traffic from the network 102 that flows to each end user network 130 connected to or otherwise associated with the network. This percentage is illustrated in column 304 of the table 300. In particular, column 304 shows the percentage of the total traffic flow that is transmitted to each end user network 130 from the CDN portion of the network, although a similar column may be created in the table 300 for other types of network traffic. As described above, the traffic flowing to the end user network 130 may come from access network A 108 or access network B 106 (among other possible access network routes to the end user network). The percentage of total traffic flow to the end user network 130 through each access network 106, 108 may be utilized to determine the end user networks 302 associated with the network 102. In another example, the number of end user networks 130 included in column 302 may be any end user network that exceeds a particular percentage of total traffic as set by the network or network administrator.

Associated with each end user network 302 listed in the table 300 is one or more egress ports from the network 102 to the listed end user network. In general, the network 102 may provide traffic or packets to each end user network 130 through any number of egress ports and or access networks 106,108. In the example of the network capacity table 300 shown in FIG. 3, the top three egress ports (and associated access networks) for providing packets to each end user network is shown. In particular, columns 306-310 provide traffic flow information for the egress port for each end user network with the highest percentage of traffic from the network to that end user network, columns 312-316 provide traffic flow information for the egress port for each end user network with the second highest percentage of traffic from the network to that end user network, and columns 318-322 provide traffic flow information for the egress port for each end user network with the third highest percentage of traffic from the network to that end user network. Although the traffic flow information for three egress ports for each end user network 302 is shown, the table 300 may include such information for any number of egress ports. In one particular implementation, the table 300 includes such information for the top five egress ports for each end user network.

The rows of the table 300 provide traffic flow information for the end user network 302 identified in the row. For example, end user network A is listed in row 324 of the table 300. Thus, the information included in row 324 of the table 300 relates to the traffic flow to that particular end user network. For this end user network, column 306 includes an identifier 306 for the top egress port to that end user network, column 308 includes the percentage of total traffic transmitted to that end user network from the network 102 through the egress port identified in column 306, and the available capacity through that egress port is listed in column 310 (listed as available units of data in the table). In one implementation, the capacity through the identified egress port is obtained by the network by transmitting one or more queries to the router or routers associated with the egress port and recording usage during peak periods (or other time periods similar to the desired time period). In the particular example of end user network A, the table 300 indicates that the egress port from the network to the end user network with the highest percentage of traffic is 1000 SJO, which receives 22% of the total traffic sent to end user network A from the network, and has zero or no available capacity. As used herein, each egress port is identified by an identification number of an associated access network 106, 108 and an indication of the particular city or metro in which the port is located. Thus, the egress port discussed above identifies the associated access network by number 1000 and the city code SJO. Similar traffic flow information is provided for the egress port with the second highest percentage of traffic from the network to that end user network in columns 312-316 and the egress port with the third highest percentage of traffic from the network to that end user network in columns 318-322. Also, similar traffic flow information is provided for the other listed end user networks 302 in the table 300. In some instances, such as indicated in row 326 for end user network J, all of the traffic sent to that end user network is provided through one egress port such that percentage of total traffic 308 sent to the highest listed egress port 306 is 100%.

Returning to the method of FIG. 2, the network 102 or administrator may analyze the traffic flow information included in the table 300 to determine an estimated capacity for providing data or services to one or more end users 104 of the network in operation 210. In particular, the network 102 may utilize the information of the network capacity table 300 to quickly determine if any egress ports in the table for the listed end user networks 302 would become congested or impaired based on an overall traffic mix, without some sort of network reconfiguration. Columns 330-338 of the network capacity table 300 provide an indication of the capacity available for the various listed end user networks 302. The indications of the available capacity for each listed end user network 302 may be utilized by the network 102 or an administrator to determine how to configure the network to provide the requested data and/or services, as discussed in more detail below.

Through the table 300, the available capacity (illustrated in the table in available units of data) for each end user network 302 is determined. For example, the row 324 for end user network A indicates an available capacity (column 330) of zero or no capacity. To arrive at the available capacity, the table 300 analyzes the traffic flow information for each egress ports associated with end user network A in row 324 (as seen in columns 306-322) and determines the minimum capacity available. End user network A as shown in row 324 has no capacity because the capacity for the egress port with the highest percentage of total traffic to that end user network is zero, as can be seen in column 310. Similarly, the capacity for the egress port with the second highest percentage of total traffic to that end user network is zero, as can be seen in column 316. Note that column 322 indicates that the egress port with the third highest percentage of total traffic to that end user network has capacity (which is 6 units in the example shown in FIG. 3). However, because there is no capacity on egress port 1 and egress port 2 for end user network A, the overall capacity for additional traffic flow to access port A is zero (as shown in column 330) as the available high quality (i.e., without congestion in this example) capacity is limited by the egress port with the lowest amount of available capacity. In one implementation of the table 300, the limiting egress port for a particular end user network is indicated in column 338. In other words, the listed limiting egress port 338 for each end user network 302 is the egress port for that end user network that will hit zero capacity first and thereby limits the total available capacity to that end user network.

In some instances, however, an end user network may have some available capacity for providing data to one or more end users 104 of the network 102. For example, row 342 associated with end user network E indicates that the end user network has 144 units of available capacity (as shown in column 330 for row 342). This capacity is determined through the traffic flow information for the egress ports associated with end user network shown in columns 306-322. In particular, the traffic flow information in row 342 indicate that 25% of traffic to end user network C is transmitted through egress port 1002 SJO with an available capacity of 36 units (columns 306-310), 22% of traffic to end user network C is transmitted through egress port 1005 WDC with an available capacity of 84 units (columns 312-316), and 19% of traffic to end user network C is transmitted through egress port 1002 SEA with an available capacity of 38 units (columns 318-322). Thus, because each egress port for the end user network has some available capacity, the network 102 may provide additional data or services to end users through the end user network.

To determine the available capacity to that end user network, the network 102 or administrator may calculate how much data may be transmitted to the egress ports for the end user network before the available capacity for one egress port is consumed. In the particular example of end user network C, the limiting egress port is 1002 SJO (column 338 of row 324) with 36 units of available capacity (column 310 of row 324). However, because egress port 1002 SJO only carries 25% of the total traffic to that end user network (column 308 of row 324), the total available capacity for the end user network (column 330) is not limited to exactly 36 units of available capacity. Rather, as the network 102 provides data to end user network C, the traffic is broken up among the various egress ports based on the percentages illustrated for each egress port. Thus, available capacity is consumed for each egress port associated with the end user network as data is transmitted through the ports from the network to end user network C. Because the traffic is generally shared among the egress ports for end user network C, the network 102 may transmit 144 units of data or services (column 330 of row 324) to end user network C before egress port 1002 SJO reaches zero available capacity. The available capacity (column 330) is calculated by taking the minimum of the available capacity divided by the percentage of total traffic to that end user network for each egress port. In this example, egress port 1002 SJO is the limiting egress port and reaches zero available capacity first among the egress ports associated with end user network C. In this manner, the available capacity to each end user network (as shown in column 330) is determined by considering the available capacity of one or more egress ports from the network 102 to the end user network and calculating the available capacity an egress port has no more available capacity.

In a similar manner, the network 102 or administrator may determine the overall available capacity for the combination of listed end user networks 302. In particular, column 336 provides the available capacity for each end user network if data is provided to all of the listed end user networks 302 in the table 300. Similar to above, the available capacity for each end user network is not necessarily limited to the available capacity listed in column 330. Rather, the network 102 may provide data to all of the available end user networks such that the data is broken up among the various listed end user networks. Thus, the available capacity listed in column 336 for each listed end user network is the amount of data (in whichever convenient unit of data such as gigabytes or terabytes) that may be transmitted to the end user network before one of the end user networks runs out of available capacity. The available capacity (column 336) for the end user networks is calculated by taking the minimum of the available capacity divided by the percentage of total traffic transmitted from the network. In the shown example, the available capacity for data provided to the end user network A (column 336 of row 324) is zero because, although the network 102 transmits 8.45% of all traffic to end user network A (column 304 of row 324), end user network A has no available capacity (column 330 of row 324). In contrast, end user network C (row 342) has 144 units of available capacity (column 330 of row 342) and, as 7.20% of the overall traffic sent to end user networks by the network 102 is transmitted to end user network C (column 304 of row 342), 2,000 units of data may be transmitted to end user network C before the available capacity of end user network C is consumed (column 336 of row 342). In this manner, the available capacity to each end user network (as shown in column 336) is determined by considering the available capacity for each of the end user networks listed 302 from the network 102 before the available capacity for each end user network is consumed.

In addition, the table 300 may include a maximum available capacity for the network region, shown as entry 340. In one implementation, the maximum available capacity for the network region is the minimum available capacity for all of the end user networks denoted in column 338. In the example shown in FIG. 3, the network 102 has no available capacity to provide the request for data and/or services from the customers because several of the end user networks are at full capacity, namely end user network A, end user network B, and end user networks E-G. This is indicated in column 336 by the zero value in the rows for those end user networks. Thus, based on the traffic flow information included in the network capacity table 300, the network 102 or network administrator cannot meet the request of the customer without impacting other traffic on the network. However, the table 300 may further be utilized by the network or administrator to determine a network configuration to meet the customer's request. Upon determining the network configuration to meet the customer's request and returning to FIG. 2, the network 102 may adjust the network configuration to provide the requested data and/or services based on the information in the network capacity table 300 in operation 212. One example of utilizing the table to adjust the network configuration is illustrated in the network capacity table 400 of FIG. 4.

Figure 4:
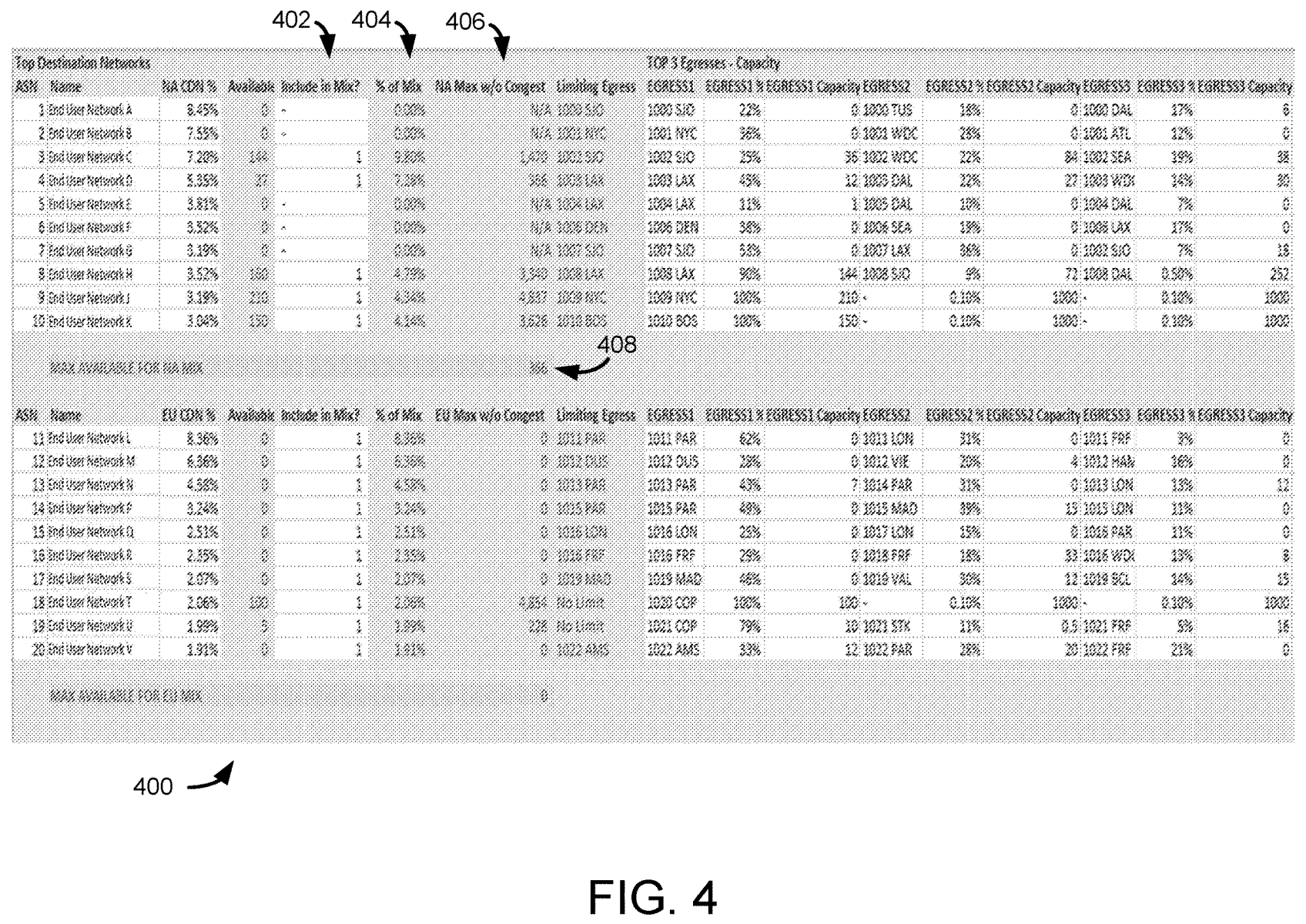

In general, the network capacity table 400 of FIG. 4 is populated with the same network traffic flow information as the table 300 of FIG. 3 such that the calculated estimated capacity available for end user networks and egress ports is the same. However, in this example, table 400 may be adjusted to remove end user networks that do not have available capacity. In particular, column 402 of the table 400 includes a binary entry to indicate whether the particular end user network associated with the entry is included in the calculations of available capacity of the network 102. In the implementation shown, a "1" value in column 402 indicates that the end user network for that row is included in the overall capacity calculation and a "-" value in column indicates that the end user network for that row is not included in the overall capacity calculation. In general, any binary value may be included in the column 402 to indicate the inclusion of the related end user network, including a yes or no indication.

When an end user network is removed from the calculation, other values in the table 400 are adjusted accordingly. In particular, the percentage of overall traffic transmitted by the network to a particular end user network (shown in column 404) adjusts as end user networks are removed from the calculations of the table 400. In other words, the traffic share seen by a particular end user network is redistributed to the other included end user networks in the table 400 when the particular end user network is removed. In one implementation, the particular end user networks share of overall traffic is redistributed to the other end user networks based on their percentage of overall network traffic. In addition, the available capacity associated with each end user network is similarly adjusted as end user networks are removed. For example, column 406 of table 400 illustrates that, for those end user networks that are not included in the capacity calculation, the available capacity is indicated as "N/A". Thus, because the end user networks are removed from consideration in the table 400, the end user network has no available capacity to include in column 406 such that N/A is included.

As mentioned above, the table 400 includes an indication of the maximum available capacity for the network region as entry 408. The maximum available capacity for the network region is the minimum available capacity for all of the end user networks denoted in column 406. Thus, as end user networks are removed from the calculation (perhaps by changing the value included in column 402), the maximum available capacity for the network region 408 adjusts according to those end user networks that are included in the calculation. In the example shown in table 400, the maximum available capacity 408 for providing data and/or services to end users of the network 102 is 366 units. This value indicates the available calculated capacity that may be provided by the network 102 to the remaining end user networks before end user network D hits full capacity.

As mentioned above, the network 102 or an administrator may utilize the network capacity table 400 to adjust a network configuration to respond to a request made by a customer of the network. In particular, the network 102 may utilize the table 400 to determine which end user networks may be included in transmitting data or services to end users of the network. For example, utilizing the table 400 of FIG. 4, the network 102 may determine that end user network A, end user network B, and end user networks E-G have no available capacity to provide data in response to a request by a customer. However, by removing these end user networks as possible transmission paths to the end customers, the network 102 may provide 366 units of data or services to the end users. If the customer request includes a data transfer that exceeds the amount of maximum available capacity, the network 102 may remove end user network D from receiving transmitted data to obtain an even higher maximum available capacity. In this manner, a set of available end user networks may be determined that provide enough available capacity to meet the needs of the customer's request.

Further, the network 102 may then utilize the set of available end user networks to meet the customer's request and configure the network transmission paths to end user networks accordingly. For example, through use of the table 400, the network 102 determines which end user network are at capacity or near capacity. The network 102 may then adjust the available transmission paths for providing the data and/or services to avoid at capacity end user networks so that the request of the customer may be fulfilled by the network. In another example, the network 102 may utilize the table 400 to determine which egress ports are at or near capacity and route the data to those egress ports that have additional capacity. In yet another example, the network may determine which end user networks are shared by the end users of the network 102 such that end user networks with higher available capacity may be selected by the network to provide the data and/or services. In general, the network 102 may adjust the configuration of the network and/or transmission paths from and/or through the network in response to the network capacity table in an attempt to meet the request from the network customer.

It should be appreciated that the network capacity table may not be generated by the network 102. Rather, the table is merely a representation of traffic flow information obtained by the network and correlated to indicate the limiting egress ports and end user networks. The calculations described above and entered in the table may be performed automatically by network 102 in one embodiment of the present disclosure. With the calculated available capacity determined, the network 102 may adjust the configuration of the network accordingly without presenting the information in a table form. In another embodiment, the network 102 may perform the operations described automatically but provide the network flow information in the table for an administrator to view and understand the changes made to the network configuration.

Previously, a network may determine the available capacity to provide a request from a customer to end users by simply adding all available capacity for the end user networks in communication with the network. However, this approach failed to consider that some egress ports between the network and the access ports may be fully congested or at full capacity, which may be hidden by the presence of other egress ports for that end user network that has some available capacity. In addition, it can be difficult to determine how traffic will utilize end user networks to reach an end user network not directly connected to the CDN, particularly when multiple end user networks and/or connections to end user networks are involved and each share some traffic. Through the operations and tables described herein, the network may analyze the traffic flow and available capacity at one or more egress ports for one or more end user networks for providing data and services to end users. By analyzing the percentage of all traffic flowing through the egress ports and end user networks and the available capacity at each egress port, a more accurate determination of the available network capacity to provide data and/or services is achieved. Further, this information may be utilized to aid in adjusting the network configuration to avoid congested connections and/or end user networks to better provide the requested data or services from the customer.

Additional information may also be gathered by the network and considered in the network capacity table. For example, the network capacity table 300 of FIG. 3 indicates that 25% of all traffic to end user network C 342 passes through egress port 1002 SJO. However, it may be that the network 102 connects to more than end user network C 342 through that egress port such that additional traffic may pass through the egress port than is currently illustrated in the table 300. If an egress port supports more than one end user network, the estimated available capacity determined through an analysis of the traffic flow information may be inaccurate. Thus, in another implementation of the present disclosure, the network capacity table 300 may account for all traffic that flows through a particular egress port when determining the available capacity and, in particular, how much data may be given to the egress port before the port reaches maximum capacity. To account for the traffic through a particular port, the table 300 may adjust the calculations made to determine available capacity accordingly to provide a more accurate available capacity measurement in the table 300. Through this, the network 102 may determine the available capacity for one or more transmission paths through the various end user networks connected or in communication with the network for providing data and/or services to end users of the network.

In addition, the telecommunications network may utilize the capacity information to provide versatility in providing and billing for provided content. For example, the information may be used in an auction-type of system to price bandwidth which would then result in the highest bidder being allowed to utilize certain paths, while selling remaining bandwidth paths to the next bidder. Thus, the action taken by the telecommunications network in response to the information of the tables may be to alter a pricing scheme for access to one or more of the egress ports of the CDN. Also, the network may utilize the information of the tables to determine if demand for content cannot be met and inform one or more of the requesting customers how much traffic can be served before capacity is reached. In this manner, the information obtained and stored may be utilized by the telecommunications network for any purposes to respond to changes in capacity on the egress ports to the end user networks.

Figure 5:
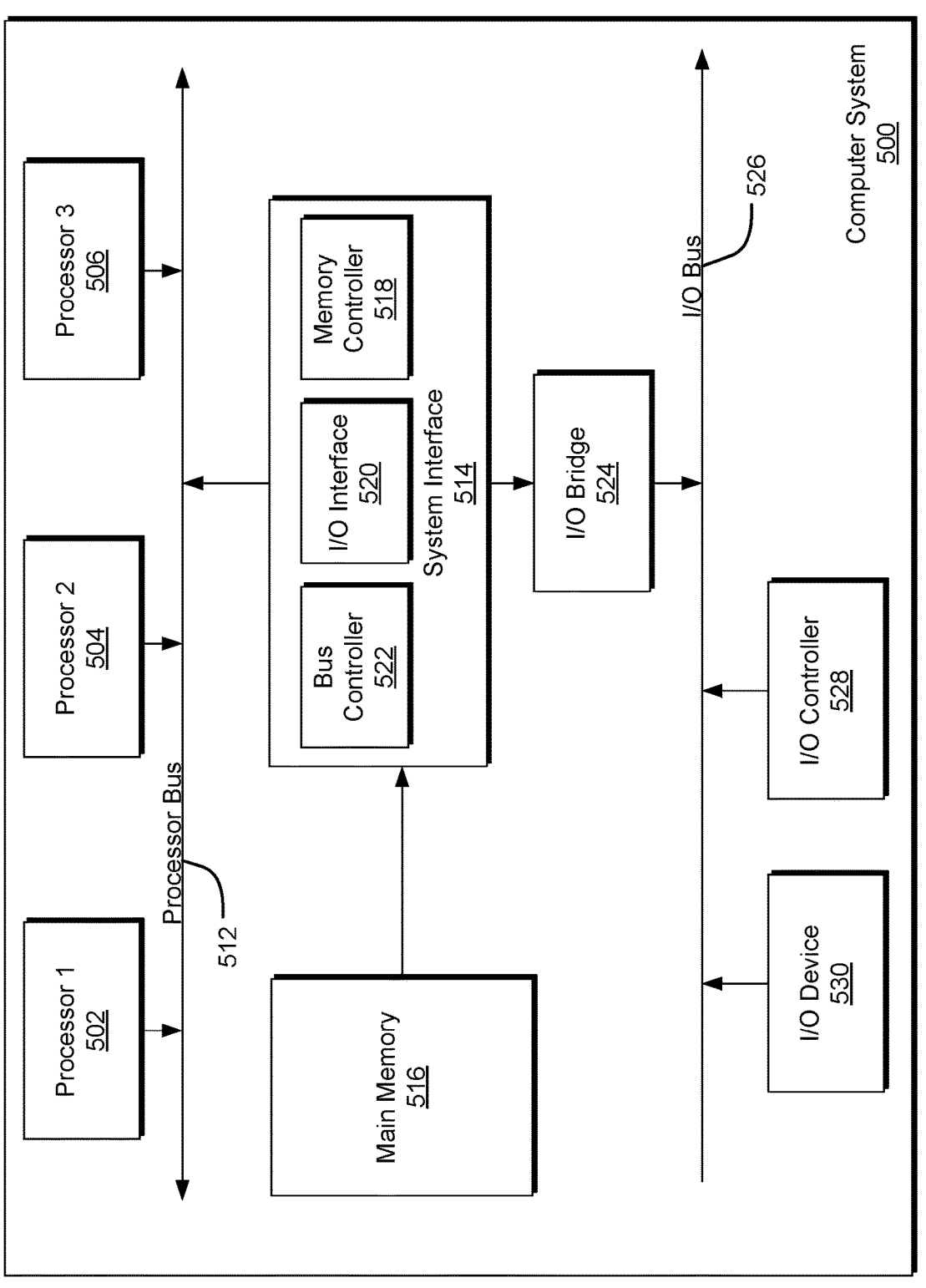
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the network disclosed above. In particular, the computing device of FIG. 5 is one embodiment of a computing device of the network that may perform one or more of the operations described above with reference to FIG. 2. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for operating a telecommunications network, the method comprising:

obtaining, for the telecommunications network, traffic flow information comprising an estimated bytes of data transmitted from the telecommunications network through at least one egress port to at least one end user networks in communication with the telecommunications network, wherein the at least one egress port is associated with the at least one end user networks;

determining an estimated capacity for the at least one egress port;

based at least on the estimated capacity for the at least one egress port, adjusting a network configuration associate with the at least one end user network by redistributing traffic transmitted to the at least one end user network;

based on the adjusted network configuration and the redistributed traffic, providing a requested network service to the at least one end user network of the telecommunications network;

generating a traffic flow table comprising, for each end user network communicatively coupled to the telecommunications network, the estimated bytes of data transmitted and the estimated capacity;

programmatically determining the estimate capacity for each end user network by dividing a minimum of an available capacity divided by a percentage of total traffic transmitted from the telecommunications network, determining, based on the traffic flow table, that a respective end user network is congested; and based on the respective end user network being congested, removing data associated with the respective end user network from the traffic flow table, wherein the network configuration is adjusted based on the removed data.

2. The method of claim 1, wherein determining the estimated capacity comprises:

accessing an available capacity of the at least one egress port and a total bytes of data transmitted from the telecommunications network;

determining a percentage of the total bytes of data transmitted to the at least one egress port; and dividing a minimum of the available capacity by the percentage of total bytes of data transmitted to the at least one egress port.

3. The method of claim 1, further comprising receiving a request from a customer to provide a telecommunication service to a plurality of end users, wherein the estimated bytes of data transmitted from the telecommunications network correspond to the telecommunication service provided to the plurality of end users, wherein providing the requested network service comprises adjusting a bandwidth associated with the telecommunications network to provide the telecommunication service to the plurality of end users.

4. The method of claim 1, wherein adjusting the network configuration associated with the at least one end user network comprises:

determining that an end user network lacks capacity;

removing the end user network lacking capacity, and redistributing traffic associated with the removed end user network lacking capacity to the at least one end user network.

5. The method of claim 1, further comprising receiving a first indication of a percentage of total traffic transmitted from the telecommunications network to the at least one end user network through the at least one egress port, wherein the estimated capacity is determined based on the first indication and a second indication of available capacity for the at least one egress port.

6. The method of claim 5, wherein the estimated capacity comprises an indication of a quantity of data transmitted from the telecommunications network to the at least one end user network before the available capacity for the at least one egress port is zero.

7. The method of claim 1, wherein adjusting the network configuration comprises removing one or more end user networks from a list of available end user networks, wherein the traffic transmitted to the at least one end user network is redistributed based on the one or more removed end user networks.

8. The method of claim 7, further comprising determining that the estimated capacity for the one or more removed end user networks is zero, wherein the one or more removed end user networks are removed from the list of available end user networks based on the estimated capacity for the one or more user networks being zero.

9. A computing system for operating a telecommunications network, the computing system comprising:

at least one processor; and a computer-readable medium communicatively coupled to the processor and including instructions stored thereon and executable to cause the computing system to perform operations comprising:

obtaining, for the telecommunications network, traffic flow information comprising an estimated bytes of data transmitted from the telecommunications network through at least one egress port to at least one end user networks in communication with the telecommunications network, wherein the at least one egress port is associated with the at least one end user networks;

determining an estimated capacity for the at least one egress port;

based at least on the estimated capacity for the at least one egress port, adjusting a network configuration associate with the at least one end user network by redistributing traffic transmitted to the at least one end user network;

based on the adjusted network configuration and the redistributed traffic, providing a requested network service to the at least one end user network of the telecommunications network;

generating a traffic flow table comprising, for each end user network communicatively coupled to the telecommunications network, the estimated bytes of data transmitted and the estimated capacity;

programmatically determining the estimate capacity for each end user network by dividing a minimum of an available capacity divided by a percentage of total traffic transmitted from the telecommunications network;

determining, based on the traffic flow table, that a respective end user network is congested; and based on the respective end user network being congested, removing data associated with the respective end user network from the traffic flow table, wherein the network configuration is adjusted based on the removed data.

10. The computing system of claim 9, wherein determining the estimated capacity comprises:

accessing an available capacity of the at least one egress port and a total bytes of data transmitted from the telecommunications network;

determining a percentage of the total bytes of data transmitted to the at least one egress port; and dividing a minimum of the available capacity by the percentage of total bytes of data transmitted to the at least one egress port.

11. The computing system of claim 9, wherein the operations further comprise receiving a request from a customer to provide a telecommunication service to a plurality of end users, wherein the estimated bytes of data transmitted from the telecommunications network correspond to the telecommunication service provided to the plurality of end users, wherein providing the requested network service comprises adjusting a bandwidth associated with the telecommunications network to provide the telecommunication service to the plurality of end users.

12. The computing system of claim 9, wherein adjusting the network configuration associated with the at least one end user network comprises:

determining that an end user network lacks capacity;

removing the end user network lacking capacity, and redistributing traffic associated with the removed end user network lacking capacity to the at least one end user network.

13. The computing system of claim 9, wherein the operations further comprise receiving a first indication of a percentage of total traffic transmitted from the telecommunications network to the at least one end user network through the at least one egress port, wherein the estimated capacity is determined based on the first indication and a second indication of available capacity for the at least one egress port.

14. The computing system of claim 13, wherein the estimated capacity comprises an indication of a quantity of data transmitted from the telecommunications network to the at least one end user network before the available capacity for the at least one egress port is zero.

15. The computing system of claim 9, wherein adjusting the network configuration comprises: removing one or more end user networks from a list of available end user networks, wherein the traffic transmitted to the at least one end user network is redistributed based on the one or more removed end user networks.

16. The computing system of claim 15, wherein the operations further comprise determining that the estimated capacity for the one or more removed end user networks is zero, wherein the one or more removed end user networks are removed from the list of available end user networks based on the estimated capacity for the one or more user networks being zero.

17. A non-transitory computer readable storage medium with instructions stored thereon that, when executed by a computing system, perform operations comprising:

obtaining, for a telecommunications network, traffic flow information comprising an estimated bytes of data transmitted from a telecommunications network through at least one egress port to one or more end user networks in communication with the telecommunications network, wherein the at least one egress port is associated with the one or more end user networks;

determining an estimated capacity for the at least one egress port;

based at least on the estimated capacity for the at least one egress port, adjusting a network configuration associate with the at least one end user network by redistributing traffic transmitted to the at least one end user network;

based on the adjusted network configuration and the redistributed traffic, providing a requested network service to the at least one end user network of the telecommunications network, generating a traffic flow table comprising, for each end user network communicatively coupled to the telecommunications network, the estimated bytes of data transmitted and the estimated capacity;

programmatically determining the estimate capacity for each end user network by dividing a minimum of an available capacity divided by a percentage of total traffic transmitted from the telecommunications network;

determining based on the traffic flow table, that a respective end user network is congested; and based on the respective end user network being congested, removing data associated with the respective end user network from the traffic flow table, wherein the network configuration is adjusted based on the removed data.

*   *   *   *   *